(12) United States Patent
Marsh et al.

(10) Patent No.: US 11,800,536 B2
(45) Date of Patent: Oct. 24, 2023

(54) EFFICIENT AND CONSISTENT WIRELESS DOWNLINK CHANNEL CONFIGURATION

(71) Applicant: Wi-LAN Inc., Ottawa (CA)

(72) Inventors: Gene Marsh, San Diego, CA (US);
Srikanth Gummadi, Sainikpuri (IN);
William Burchill, San Diego, CA (US);
Michael Wengler, San Diego, CA (US)

(73) Assignee: Wi-LAN Inc., Ottawa (CA)

( * ) Notice: Subject to any disclaimer, the term of this patent is extended or adjusted under 35 U.S.C. 154(b) by 0 days.

(21) Appl. No.: 17/563,321

(22) Filed: Dec. 28, 2021

(65) Prior Publication Data
US 2022/0124689 A1 Apr. 21, 2022

Related U.S. Application Data (63) Continuation of application No. 16/695,402, filed on Nov. 26, 2019, now Pat. No. 11,212,788, which is a
(Continued)

(51) Int. Cl.
*H04J 11/00* (2006.01)
*H04W 72/23* (2023.01)
(Continued)

(52) U.S. Cl.
CPC ......... *H04W 72/23* (2023.01); *H04J 11/0069* (2013.01); *H04W 4/00* (2013.01);
(Continued)

(58) Field of Classification Search
CPC ..... H04W 72/23; H04W 72/541; H04W 4/00; H04W 72/231; H04W 72/232;
(Continued)

(56) References Cited

U.S. PATENT DOCUMENTS

| 6,151,512 A | 11/2000 | Chheda et al. |
| 6,285,655 B1 | 9/2001 | Lundby et al. |

(Continued)

FOREIGN PATENT DOCUMENTS

| WO | 01/095579 | 12/2001 |
| WO | 05/039105 | 4/2005 |

OTHER PUBLICATIONS

Burchill et al., "802.16m DL Pilot Structure," IEEE C802.16m-08/193, NexWave Wireless (Mar. 10, 2007).
(Continued)

*Primary Examiner* — Kan Yuen
(74) *Attorney, Agent, or Firm* — Volpe Koenig (57) ABSTRACT

A method of wireless communication including a base station transmitting a preamble including information indicating a sector identifier and an antenna port value. The base station further transmits a pilot sequence, wherein the pilot sequence and the location of the pilot sequence are based on the sector identifier and on the antenna port value. A base station configured to perform the method is also disclosed. A corresponding subscriber station configured to receive the preamble and pilot sequence is also disclosed, as well as a subscriber station method.

20 Claims, 8 Drawing Sheets

Related U.S. Application Data continuation of application No. 15/956,820, filed on Apr. 19, 2018, now Pat. No. 10,492,194, which is a continuation of application No. 14/959,721, filed on Dec. 4, 2015, now Pat. No. 9,967,870, which is a continuation of application No. 13/675,584, filed on Nov. 13, 2012, now abandoned, which is a continuation of application No. 12/400,618, filed on Mar. 9, 2009, now Pat. No. 8,331,309.

(60) Provisional application No. 61/035,355, filed on Mar. 10, 2008.

(51) Int. Cl.
*H04W 72/541* (2023.01)
*H04W 4/00* (2018.01)

(52) U.S. Cl.
CPC . *H04W 72/541* (2023.01); *H04B 2201/70701* (2013.01); *H04B 2201/70702* (2013.01)

(58) Field of Classification Search
CPC .............. H04J 11/0069; H04J 11/0073; H04J 11/0076; H04J 11/0083; H04B 2201/70701; H04B 2201/70702; H04B 7/0602; H04B 7/0604; H04B 7/0606
See application file for complete search history.

(56) References Cited

U.S. PATENT DOCUMENTS

| | | | |
|---|---|---|---|
| 7,443,805 B1* | 10/2008 | Bynum | H04W 24/10 370/254 |
| 8,139,544 B1 | 3/2012 | Webster et al. | |
| 2004/0136349 A1 | 7/2004 | Walton | |
| 2006/0018251 A1 | 1/2006 | Park et al. | |
| 2006/0062196 A1 | 3/2006 | Cai et al. | |
| 2006/0067205 A1 | 3/2006 | Jung et al. | |
| 2006/0092892 A1 | 5/2006 | Trachewsky | |
| 2006/0114812 A1 | 6/2006 | Kim et al. | |
| 2006/0198294 A1 | 9/2006 | Gerlach | |
| 2006/0209973 A1 | 9/2006 | Gorokhov et al. | |
| 2006/0245509 A1 | 11/2006 | Khan et al. | |
| 2007/0014272 A1 | 1/2007 | Palanki et al. | |
| 2007/0133386 A1 | 6/2007 | Kim et al. | |
| 2008/0019350 A1 | 1/2008 | Onggosanusi et al. | |
| 2008/0039107 A1 | 2/2008 | Ma et al. | |
| 2008/0095108 A1* | 4/2008 | Malladi | H04J 11/0069 370/329 |
| 2008/0107086 A1 | 5/2008 | Fukuta et al. | |
| 2008/0165675 A1* | 7/2008 | Yang | H04L 27/2647 370/337 |
| 2008/0298524 A1 | 12/2008 | Koorapaty et al. | |
| 2008/0305788 A1* | 12/2008 | Malladi | H04L 27/2607 455/428 |
| 2009/0067534 A1 | 3/2009 | Kwak et al. | |
| 2009/0080385 A1 | 3/2009 | Kim et al. | |
| 2009/0092154 A1* | 4/2009 | Malik | H04L 12/2861 370/480 |
| 2009/0135803 A1* | 5/2009 | Luo | H04L 25/0226 380/268 |
| 2009/0232125 A1* | 9/2009 | Kim | H04L 27/2675 370/350 |
| 2009/0252109 A1* | 10/2009 | Kim | H04B 7/0689 370/330 |
| 2010/0027486 A1 | 2/2010 | Gorokhov et al. | |
| 2010/0061333 A1 | 3/2010 | Marsh et al. | |
| 2010/0067500 A1* | 3/2010 | Kim | H04L 5/0023 375/267 |

OTHER PUBLICATIONS

Hamiti, "IEEE 802.16m System Description Document [Draft]," IEEE 802.16m-08/003r7 (Feb. 7, 2009).

Marsh et al., "802.16m DL Control Structure: Preamble Design," IEEE C802.16m-08/192, NexWave Wireless (Mar. 10, 208).

Third Generation Partnership Project, "Technical Specification Group Radio Access Network; Evolved Universal Terrestrial Radio Access (E-UTRA); Physical Channels and Modulation (Release 8)", 3GPP TS 36.211 V8.1.0 (Nov. 2007).

Third Generation Partnership Project, "Technical Specification Group Radio Access Network; Evolved Universal Terrestrial Radio Access (E-UTRA); Physical Channels and Modulation (Release 8)", 3GPP TS 36.211 V8.5.0 (Nov. 2007).

Zyren, "Overview of the 3GPP Long Term Evolution Physical Layer," Freescale Semiconductor, Inc. (Jul. 2007).

* cited by examiner

Figure 1

FIG. 2A THE 16M FRAME STRUCTURE FROM 16M BS's VIEWPOINT

FIG. 2B THE 16M FRAME STRUCTURE IN COMPLETELY GREENFIELD DEPLOYMENT

Figure 8

EFFICIENT AND CONSISTENT WIRELESS DOWNLINK CHANNEL CONFIGURATION

CROSS REFERENCE TO RELATED APPLICATIONS

This application is a continuation of U.S. patent application Ser. No. 16/695,402, filed Nov. 26, 2019, which issued as U.S. Pat. No. 11,212,788 on Dec. 28, 2021, which is a continuation of U.S. patent application Ser. No. 15/956,820, filed Apr. 19, 2018, which issued as U.S. Pat. No. 10,492,194 on Nov. 6, 2019, which is a continuation of U.S. patent application Ser. No. 14/959,721, filed Dec. 4, 2015, which issued as U.S. Pat. No. 9,967,870 on May 8, 2018, which is a continuation of U.S. patent application Ser. No. 13/675,584, filed Nov. 13, 2012, which is a continuation of U.S. patent application Ser. No. 12/400,618, filed Mar. 9, 2009, which issued as U.S. Pat. No. 8,331,309 on Dec. 11, 2012, which claims the benefit of U.S. Provisional Application No. 61/035,355, filed Mar. 10, 2008. All of the above mentioned applications are incorporated by reference.

This application also incorporates by reference U.S. patent application Ser. No. 12/265,435, filed on Nov. 5, 2008, entitled "Advanced Technology Frame Structure with Backward Compatibility," now U.S. Pat. No. 8,139,537.

FIELD OF INVENTION

The disclosure relates to the field of wireless communications. More particularly, the disclosure relates to an efficient downlink frame structure for a wireless communication system.

BACKGROUND

Wireless communication systems are often confronted with similar performance issues. For example, a wireless communication systems needs to support many clients by enabling each of the clients to rapidly acquire and process the information provided by the system. Additionally, the clients or subscriber stations need to be able to address parameters and factors that degrade performance, such as inter-cell interferences.

It is desirable for a wireless system to address various aspects such as the above-mentioned performance issues in a manner that optimizes system performance.

SUMMARY

A configuration for downlink signals in a wireless communication system, methods of configuring the downlink signals, apparatus for generating the downlink signals, and apparatus for receiving and processing the downlink signals are described herein. Downlink signals in a wireless communication system are reconfigured in series of frames, with each frame carrying a preamble that provides fast cell search and system acquisition. In particular, the preamble includes a primary preamble and a secondary preamble, where the primary preamble is common to all sectors in a base station and all base stations in a system and the secondary preamble is effectively unique to each base station, and may be further distinguished based on a sector basis. In addition, pilot signals are aligned with base stations to occur at the same time within a frame and the PN sequence values of the pilot signals are based on a cell identification an antenna identification, thereby enabling prediction of pilots transmitted by interferers or neighboring base stations from acquisition of secondary preambles. Also, the pilot bits are selectively assigned from a center of an operating band outward. Due to the pilot placement and pilot modulation, the scheme enables interference mitigation and channel estimation without knowing the frequency bandwidth, which is especially advantageous in broadcast channel systems.

One aspect includes a method of downlink signaling in a wireless communication system. The method includes transmitting a preamble having at least a portion that is common across multiple sectors and base stations within the wireless communication system, and transmitting a pilot sequence that is aligned in time and frequency with at least one distinct pilot sequence transmitted by a distinct base station.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF THE PREFERRED EMBODIMENTS

A configuration of downlink signals for a wireless communication system, and in particular, downlink signals in an Orthogonal Frequency Division Multiple Access (OFDMA) wireless communication system are described herein. The downlink signals and configurations described herein enable efficient system design, support for Multiple Input Multiple Output (MIMO) configurations, support for Intra-cell Interference Mitigation (IIM) techniques and support for new frame structures. Among other features, the downlink signal configuration can be configured to include (1) a primary universal preamble, (2) a secondary preamble that uses a predictable PN code based on the sector ID, (3) a fixed frequency bandwidth for both the primary and secondary preamble that is independent of the bandwidth of the system (4) pilot signals which use a predictable PN code based on the sector ID and antenna ID, (5) pilot bits that remain consistently placed within a slot independent of the permutation scheme used, or (6) some combination thereof.

The primary preamble can be a universal preamble. That is, the same primary preamble may be configured across all sectors in a base station and all of the base stations within a wireless communication system. Use of a primary preamble which is universal to all sectors enables a client station to use macro-diversity to acquire the primary preamble.

The secondary preamble can be specific to each base station in an area, such that a client station will not typically have the ability to concurrently observe two base stations using the same secondary preamble. Thus, the secondary preamble can be considered as unique to each base station from the perspective of a client station. The secondary preamble can also identify or otherwise be configured based on a sector of a base station, such that different sectors of the same base station will transmit distinct secondary preambles.

In one embodiment, the secondary preamble can have over 600 unique possibilities of configurations. Of course, in other embodiments, the number of unique possible secondary preambles may be varied depending on the specific system requirements. Thus, a base station or sectors of a base station would not need to share a secondary preamble unless there are a greater number of base stations or sectors than the number of possibilities. In such a situation, the sector ID or base station ID can be assigned such that the secondary preambles transmitted within a particular coverage area is unambiguous. Because the secondary preamble is independent of the primary preamble, parallel processing may be implemented during acquisition.

The bandwidth used to transmit the preamble, including the primary preamble and the secondary preamble, can be fixed. Additionally, the bandwidth used to transmit the preamble can be the same or less than the bandwidth of a frame that carries the preamble. Where the frame has a wider bandwidth than the preamble, the frequency band of the frame that is not encompassed by the preamble can be used to support some other purpose, such as data transmission.

The pilot signals broadcast by each base station, and in each sector of each base station, can be predicted based on the identity of the base station and the sector identity. For example, the pilot sequence for a particular sector within a base station may be generated based on a pseudo random sequence generator in conjunction with a cell ID that identifies both the base station and the sector. In some embodiments, the pilot sequence may also depend on an antenna configuration, such as the number of antennas used to transmit the sequence. In one embodiment, the number of antennas can correspond to the number of diversity antennas, which may be different than a number of physical antennas.

The pilot signals transmitted from all base stations can be time and frequency aligned or otherwise synchronized to occur at the substantially same time and frequency within a frame. A client station within a coverage area supported by a first sector and first base station can determine identification of one or more neighboring base stations from the shared messaging. Thus, because the client station knows the identity and/or number of neighboring base stations, it can predict the location and value of the pilots transmitted by each neighboring base station. The ability to distinctly receive and detect substantially time aligned pilot tones greatly facilitates channel estimation. The ability to efficiently perform channel estimation can facilitate implementation of Inter-cell Interference Mitigation (IIM) techniques.

In one embodiment, the bits of the pilot PN sequence can be assigned to the various pilot subcarriers in a manner that facilitates reception and processing. The pilot PN sequence bits are assigned starting from the middle of the frequency band working outward. The pilot sequence is reinitiated or otherwise reset at the beginning of each frame.

The pilot sequences can be predictable, for example, based on the sector ID and the antenna ID, which can be determined from the acquired secondary preamble. In some cases, because the client station may not know the number of antennas used in the sector before decoding the information on a broadcast channel, pilot information in the broadcast channel can be sent over a predetermined number of antennae, by use of a pilot sequence generated based upon the predetermined number of antennae, such as when there is a single antenna, it can be identified as antenna 0. Alternatively, multiple antennas could use the antenna 0 PN sequence to determine the PN sequence for the broadcast channel. Because of this predictability, interference mitigation can be used on the broadcast channel.

Figure 1:
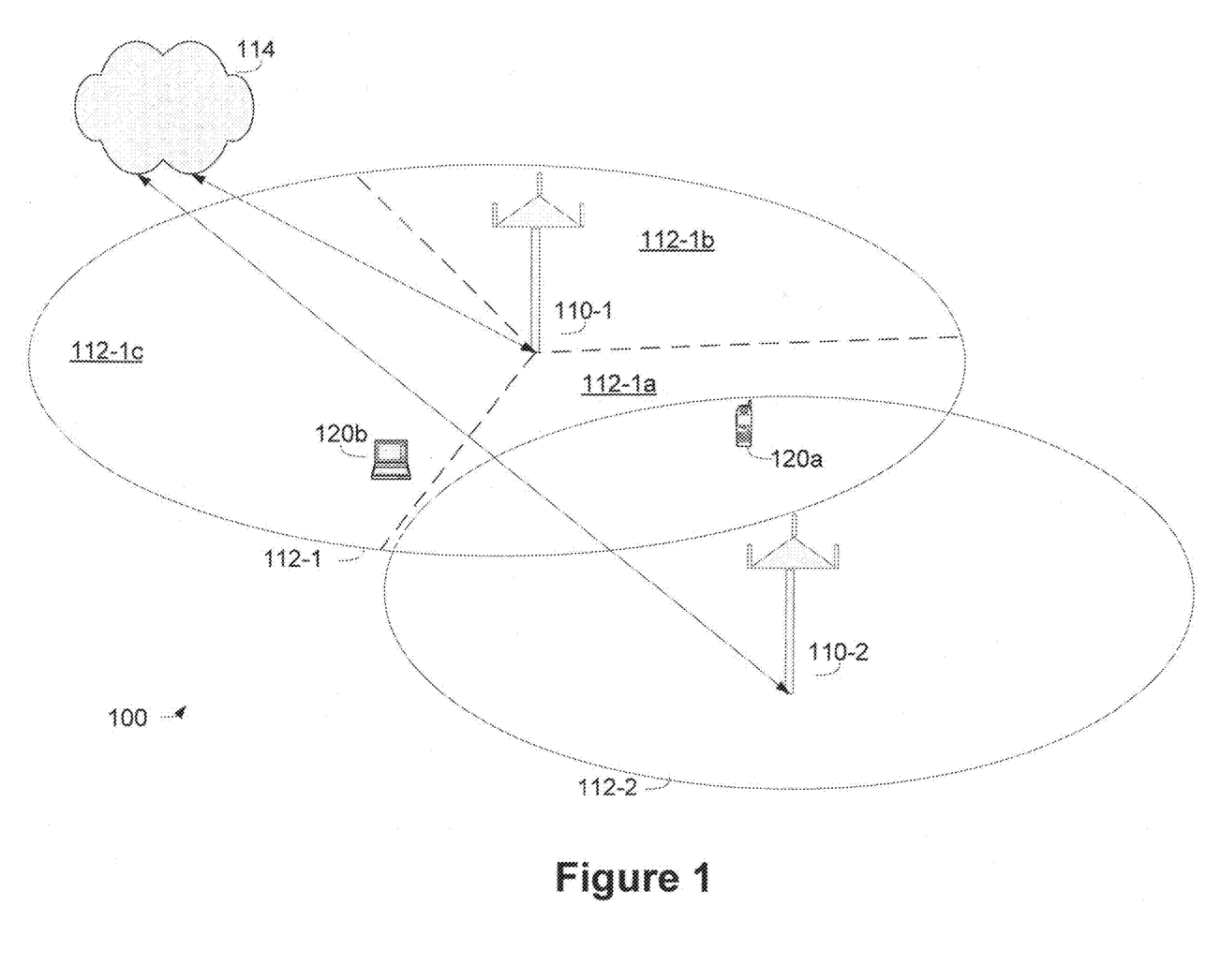
FIG. 1 is a simplified block diagram of an embodiment of a wireless communication system.

FIG. 1 is a simplified functional block diagram of a system 100 implementing the downlink signal configuration described herein an advanced technology frame structure. The wireless communication system 100 includes a plurality of base stations, such as base stations 110-1 and 110-2, coupled to a network 114, such as a wide area network. Each base station, e.g. 110-1, serves devices within its respective coverage area, e.g., 112-1, sometimes referred to as a cell.

A first base station 110-1 serves a first coverage area 112-1 and a second base station 110-2 serves a corresponding second coverage area 112-2. The base stations 110-1 and 110-2 are depicted as adjacent or otherwise neighboring base stations for the purposes of discussion.

The coverage areas 112-1 and 112-2 may be sectorized. For example, the first base station 110-1 can be configured to use a plurality of antennas to support a sectorized coverage area 112-1 having three distinct sectors, 112-1*a*, 112-1*b*, and 112-1*c*.

As an example, the base stations 110-1 and 110-2 serve those devices within the respective coverage areas 112-1 and 112-2. As shown in FIG. 1, first and second subscriber stations or client stations 120*a* and 120*b* are within the first coverage area 112-1 and can be supported by the first base station 110-1.

Each of the first and second base stations, 110-1 and 110-2, can support an efficient downlink signal structure, as described herein. Each of the base stations, 110-1 and 110-2, can transmit a preamble that includes a primary preamble and a secondary preamble. The primary preambles can be shared across the base stations 110 within the system, while the secondary preambles may differ based on the base station ID and/or sector ID.

Each base station, e.g., 110-1 and 110-2 can also transmit a pilot sequence that is determined based on a pseudo random sequence generator in conjunction with a base station ID value, a sector ID value, and a number of antennas.

First and second subscriber stations or client stations 120*a* and 120*b* can be configured to receive the efficient downlink signals and acquire the frame timing, base station and sector ID values, and otherwise communicate based on the information in the efficient downlink signals.

The wireless system 100 can be an Orthogonal Frequency Division Multiple Access (OFDMA) system, such as described in IEEE 802.16e. Additionally, the system 100 may utilize the frame structure of IEEE 802.16e or some other frame structure, such as an advanced frame structure proposed for IEEE 802.16m and described in related application U.S. patent application Ser. No. 12/265,435, filed on Nov. 5, 2008, entitled "Advanced Technology Frame Structure with Backward Compatibility."

The wireless system 100 may alternatively support some other type of communication systems, such as, but not limited to, a Long Term Evolution (LTE) system, or some variant of one or more of OFDMA, IEEE802.16, or LTE.

In the Application "Advanced Technology Frame Structure with Backwards Compatibility," new frame structures are described which incorporate an 802.16m system within an existing 802.16e system. The technology aspects described below may be applied to an 802.16m system, including one which is deployed as a Greenfield system or one which is incorporated within an existing 802.16e system. The technology aspects can also be applied to other types of systems, including, but not limited to, a Long Term Evolution (LTE) system. LTE is the name given to a project within the Third Generation Partnership Project (3GPP) to improve the Universal Mobile Telephone Service (UMTS) mobile phone standard to cope with future requirements. Goals include improving efficiency, lowering costs, improving services, making use of new spectrum opportunities and better integration with other open standards.

Figure 2A:
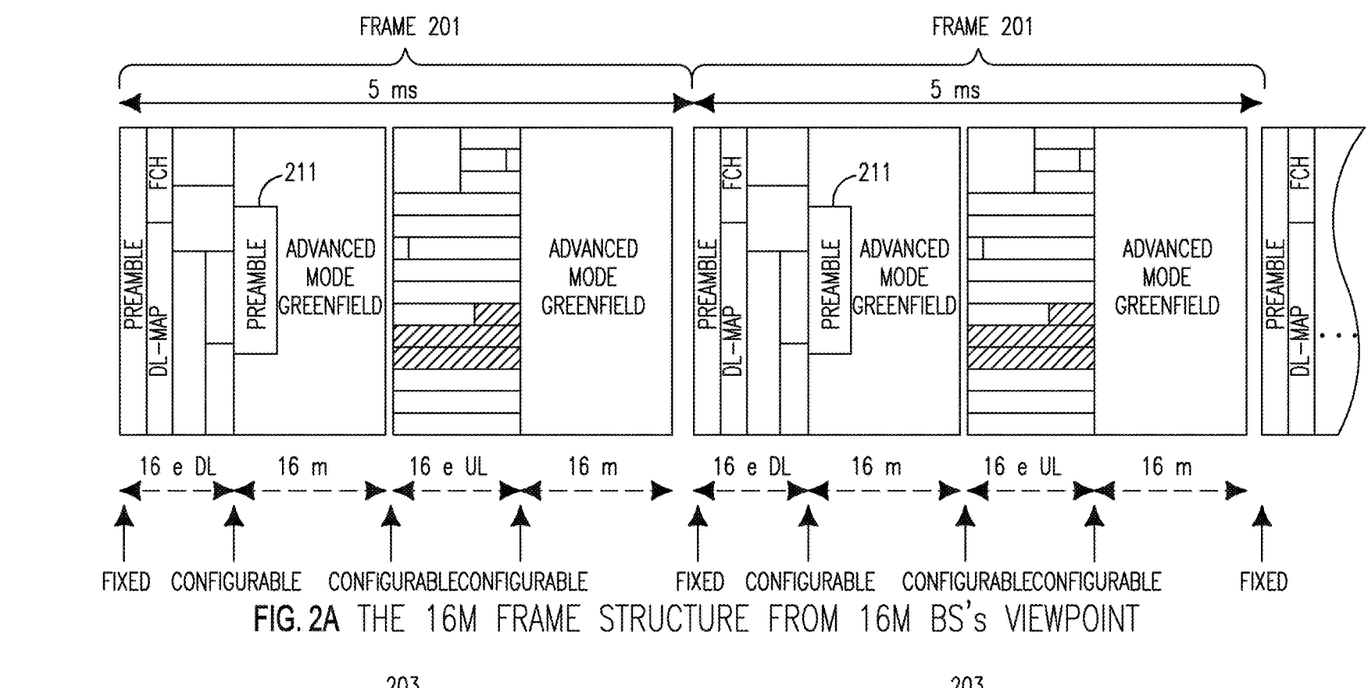
FIGS. 2a-2b are simplified timing diagrams of an embodiment of a downlink frame structure including a preamble.
Figure 2B:
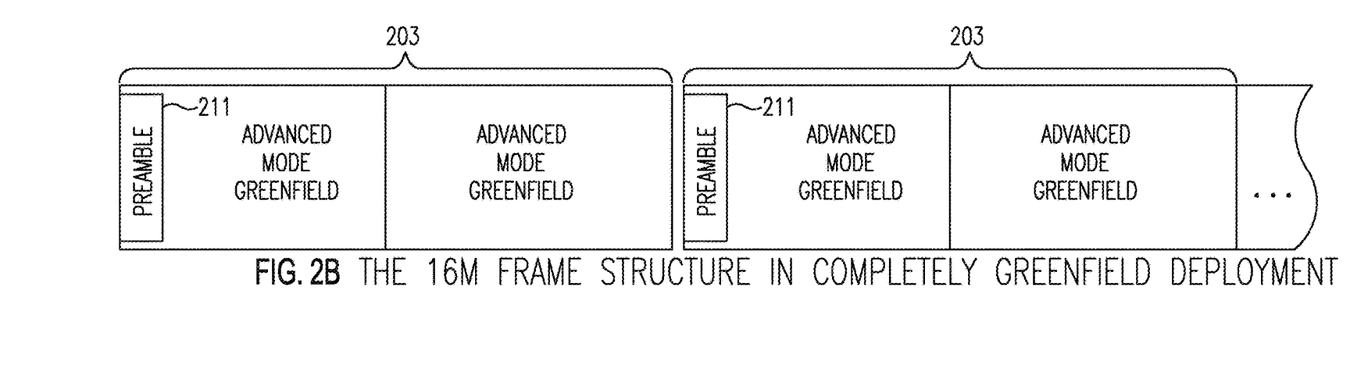

FIGS. 2a-2b are simplified timing diagrams of an embodiment of a downlink frame structure including a preamble.

FIG. 2a illustrates an advanced technology enabled base station perspective of an advanced technology frame embodiment. In operation, the frame embodiment of FIG. 2a can be supported by the system illustrated in FIG. 1. The advanced technology enabled base station is able to support communications with subscriber stations or client stations that are configured to receive either the legacy frames or the advanced technology frames or both. Since both the legacy and the advanced technology portions in the frames are multiplexed to the air link in a time division manner, the advanced technology enable base stations can allocate or process data in resource allocations in each of the sub-subframes to support communications with all subscriber stations.

Each frame 201 can include a preamble 211 that includes a primary preamble and secondary preamble. As shown in the timing diagram of FIG. 2a, the bandwidth of the preamble 211 may be narrower than the bandwidth of the frame 201. The bandwidth of the frame 201 may be fixed or may vary, but the bandwidth of the preamble 211 is fixed for all frames 201.

FIG. 2b illustrates the advanced technology frame 203 at a time in which support for legacy communications has substantially been eliminated. Nearly the entire downlink and uplink subframes are dedicated to supporting advanced technology communications. Thus, the advanced technology frame structure supports an orderly transition to advanced technology, while maintaining support for legacy devices.

Regardless of the support, or lack thereof, for the legacy devices, each frame 203 includes a preamble 211 that includes the primary preamble and a secondary preamble. As shown in the frames 203 of FIG. 2b, the preamble 211 is narrower in bandwidth than the frame 203 bandwidth. In other embodiments, the bandwidths of the preamble 211 and frame 203 can be substantially the same.

In an Orthogonal Frequency Division Multiple Access (OFDMA) system, the transmitting station can use a Fast Fourier Transform (FFT) to create a regular array of subcarriers distributed across a frequency band. Each subcarrier is modulated to carry information, such as user data, control information, pilot signaling and the like. The receiving station can also use an FFT, IFFT, or some other transform to extract information from the subcarriers.

For the purposes of example, some sample numerical values are included herein. These values are intended to facilitate the description only. Many different numerical values could be used to implement various aspects of this technology.

In the example herein described, a sample time for signaling in a IEEE802.16m system is defined as: $T_{samp}=1/(12500\times2048)$ s$=0.0390625$ μs, yielding $F_s=25.6$ MHz. This corresponds to the sample time for a 2048-point FFT with a subcarrier spacing $\Delta f=12.5$ kHz tone spacing. The useful symbol time is $T_b=80$ μs. This example supports a cyclic prefix (CP) of ⅛ or ¼ of a useful symbol time. A CP of ⅛ yields a guard time of $T_g=10$ μs, yielding a symbol time of $T_s=90$ μs, and a CP of ¼ yields a guard time of $T_g=20$ μs, yielding a symbol time of $T_s=100$ μs.

Figure 3:
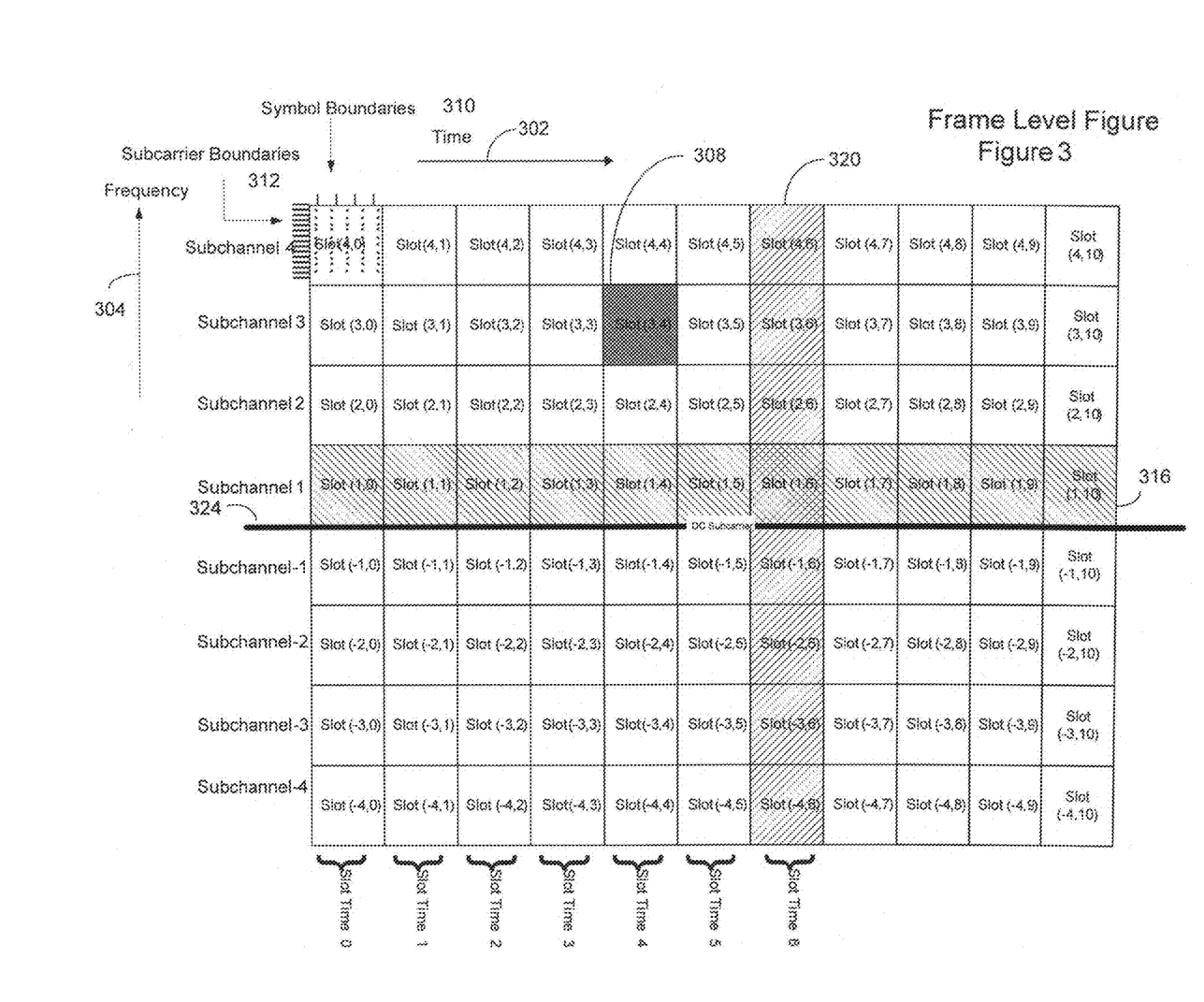
FIG. 3 is a time/frequency diagram illustrating an embodiment of a downlink frame in an OFDMA system.

FIG. 3 is an illustrative drawing showing a frame level representation of a portion of an OFDMA frame 300 configured as a Green field deployment, as shown in FIG. 2a. The principles can be directly applied to a system which is deployed in conjunction with another system as shown in FIG. 2b. In FIG. 3, time 302 is shown on the horizontal axis and is increasing from left to right. Frequency 304 is shown on the vertical axis and is increasing from bottom to top. In OFDMA, multiple access is achieved by assigning to an individual client station a group of OFDM tones. These tones are referred to herein as subcarriers. For example, a group of subcarriers 306 is indicated on FIG. 3 as an array of dots. In FIG. 3, the group of subcarriers 306 is five symbols wide as indicated by the four symbol boundaries 310. The group of subcarriers 306 is 16 subcarriers tall, as indicated by the 15 subcarrier boundaries 312.

A base station does not assign individual subcarriers for use by a specific client station. Instead, the base station assigns the subcarriers to a client station in groups of a fixed size. These groups are referred to herein as slots and are often more generically referred to as allocation units. In FIG. 3, a slot 308 includes an array of subcarriers which is shown as a block that is five symbols wide and 16 subcarriers tall.

A subchannel can be defined as a group of contiguous subcarrier rows, which according to the numeric example given above, includes 16 subcarrier rows and spans 200 kHz in the frequency domain. A subchannel is measured in terms of frequency and extends beyond slot and frame boundaries. For example, Subchannel 316 is indicated in FIG. 3 with hash marks and is designated as subchannel 1.

In addition, $N_{sub}^{DL}$ is used to represent the number of subchannels spanned by the downlink, and $N_{sub}^{UL}$ is used to represent the number of subchannels spanned by the uplink. In this example, a number of subchannels can vary in integer steps from 6 to 100. Typically the number of subchannels is determined based on the frequency width of the available spectrum. The number of subchannels may be different between the downlink and the uplink to allow for asymmetric FDD operation. In an asymmetric FDD system, the span of the spectrum allotted to the uplink and the downlink are different from one another. Such a system might be designed based on the availability of spectrum or based on the premise that the expected data load for the uplink and the downlink are different. Table 1 shows some exemplary values for a set of possible system band widths, assuming that $N_{sub}^{DL}=N_{sub}^{UL}$.

TABLE 1

A comparison of occupied bandwidths.

| System BW (MHz) | $N_{sub}^{XX}$ | 802.16 m Occupied BW (MHz) | .16 e PUSC Occupied BW (MHz) | .16 e FUSC Occupied BW (MHz) | .16 e AMC Occupied BW (MHz) |
|---|---|---|---|---|---|
| 1.25 | 6 | 1.20 | .093 | 1.17 | 1.19 |
| 3.50 | 16 | 3.20 | 3.29 | 3.34 | 3.38 |
| 5.00 | 23 | 4.60 | 4.60 | 4.67 | 4.74 |
| 7.00 | 33 | 6.60 | 6.57 | 6.65 | 6.76 |
| 8.75 | 42 | 8.40 | 8.21 | 8.31 | 8.45 |
| 10.00 | 47 | 9.40 | 9.20 | 9.31 | 9.46 |
| 20.00 | 94 | 18.80 | 18.39 | 18.63 | 18.91 |

The time duration of a slot is referred a slot time (h.). In FIG. 3, the slot time is 5 symbols wide. Slot time is a measure of time and extends beyond subchannel boundaries.

For example, Slot time 320 is indicated in FIG. 3 with hash marks and is designated as slot time 6.

Using the definitions developed and described above, a slot can be defined as an area in time and frequency that spans one subchannel by one slot time.

Assuming a frame is 5 ms in duration, using the exemplary numerology given above, Table 2 shows the number of slot times per frame for each of the supported CP, as well as the amount of unused time at the end of a frame.

TABLE 2

Slot timing.

| CP | Slots/frame (M) | Unused Time |
|---|---|---|
| 1/8 | 11 | 1280 $T_{samp}$ = 50 μs |
| 1/4 | 10 | 0 |

For FDD systems, the downlink slot times in one frame are assigned to one of several purposes including the downlink, a multicast and broadcast service (MBS), and null (unused) slots. MBS is used to send user data to more than one user at a time and could be used to provide mobile television services. The uplink slot times are assigned to the uplink and null (unused) slots. For TDD systems, the slot times are assigned to the uplink, the downlink, MBS, and null slots.

Assume that frame 300 shown in FIG. 3 is configured as a TDD frame with 8 subchannels and 10 slots, as shown. Thus, $N_{sub}^{DL} = N_{sub}^{UL} = N_{sub}^{XX} = 8$. The subchannels are labeled from $\lfloor -N_{sub}^{XX}/2 \rfloor$ to $\lfloor N_{sub}^{XX}/2 \rfloor = [-4]$ to $[4]$ with the lowest numbered subchannel corresponding to the lowest frequency.

Assuming 16 subcarriers per subchannel, as a group, the 8 subchannels span the subcarrier rows from $-8N_{sub}^{XX}$ to $8N_{sub}^{XX} = [-64]$ to $[64]$. Using n to be the subchannel of interest, the null subchannel 0 (n=0) contains only the 0 (DC) subcarrier 324 and is not used. If n<0, then subcarrier n contains the subcarrier rows from 16n to 16(n+1)−1. If n>0, then subcarrier n contains the subcarrier rows from 16(n−1)+1 to 16n.

FIG. 3 shows the numbering scheme for slots. Slots are identified by an ordered pair (k,l), where k indicates the subchannel spanned by the slot and l indicates the slot time within a frame.

Figure 4:
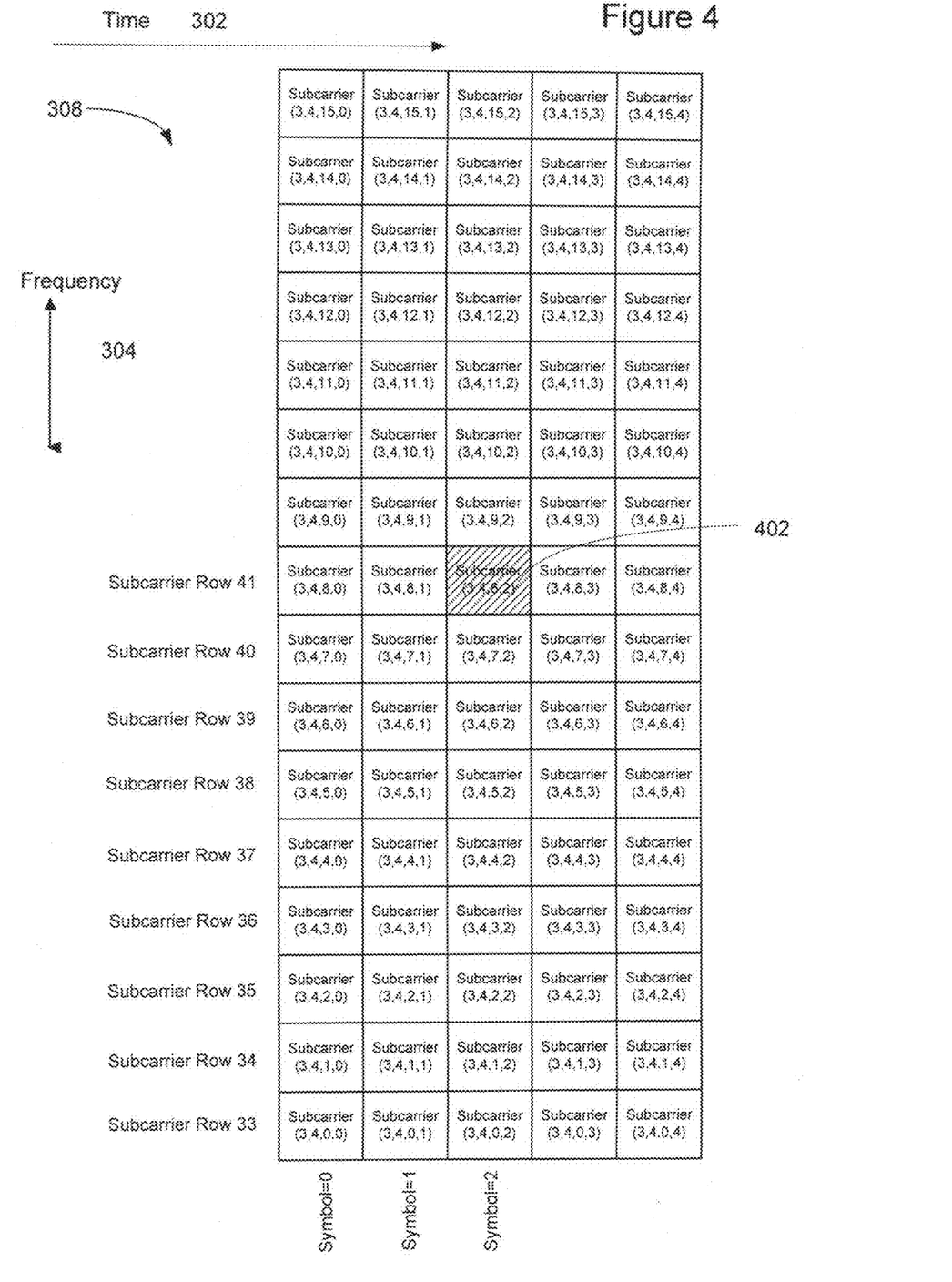
FIG. 4 is a simplified time/frequency diagram illustrating an embodiment of a slot.

FIG. 4 is an expanded view of slot 308, which is designated slot (3,4). Individual subcarriers are identified by a ordered quadruple (k, l, m, n), where (k,l) indicates the slot within a frame, m=0, . . . , 15 indicates the subcarrier within the slot (k,l), and n indicates the symbol within the slot (k,l). Thus, subcarrier 402 is designated as subcarrier (3,4,8,2). The subcarrier rows are also indicated on FIG. 4. Slot 308 spans from subcarrier row 33 to subcarrier row 48. Subcarrier 402 is in subcarrier row 41.

The first slot time in the frame is typically allocated to the downlink and contains synchronization and informational signals used to acquire the system. The other slot times can be divided between the uplink, the downlink channel, MBS, and null slots as needed.

The downlink consists of several related portions: the downlink preambles, the downlink pilots, and the downlink channels. The downlink preamble is sent at a fixed, known interval, and is used by the client stations to perform system acquisition. The downlink pilots are used by the client stations to do channel estimation. The downlink pilots are interspersed among the data carriers or otherwise sparsely seeded among the subcarriers of a slot.

The pilot pattern can vary based on the channel or portion of a frame in which the pilot is transmitted, the number of antennas available to the system, or some combination thereof.

The downlink channel portion typically includes several channel types, including the physical broadcast channel, physical downlink data channel, physical downlink control channel, physical multicast channel and the like.

According to one aspect of this disclosure, the preamble is partitioned into two pieces, namely the primary preamble and the secondary preamble. The primary preamble is used by the client station to identify frame timing. In one embodiment, the number of subchannels that the primary preamble spans remains fixed independent of the number of subchannels which are used by the system. In an IEEE 802.16e compliant system, the preamble spans an entire symbol, thus spanning across every subchannel available for use in the system. Upon initial entry into a system, the client station does not know how many subchannels are being used by the system. But even without this information, the client station knows the size of the preamble which helps speed system acquisition.

As noted with respect to FIG. 1, a base station may be comprised of multiple sectors. According to one aspect, all sectors of every base station in the system transmit the same primary preamble. Assuming the sectors are time synchronized, the use of a common primary preamble provides macro-diversity, enabling easy acquisition of the frame timing as well as location of the center of the transmit band. According to 802.16e, there is no common preamble used by multiple base station sectors and, thus, the client stations cannot use macro-diversity to detect the preamble.

Continuing with the numerical example given above, the primary preamble consistently occupies subchannels −3 to 3 in symbol 2 of slot time 0 within a frame, no matter how many subchannels make up the frame. Of the 96 subcarriers which make up subchannels −3 to 3, only the subcarriers corresponding to subcarrier rows −41 to 41 are occupied. The other subcarriers within these subchannels have no energy placed upon them. The DC subcarrier may also be vacant or otherwise have no energy placed on it.

Although other modulation schemes can be used, by way of example, the occupied subcarriers in this example are modulated with a frequency domain Zadoff-Chu sequence based on the nth roots of unity $p_u(x) = \exp(-j\pi ux(x+1)/83)$ for $x = 0, 1, \ldots, 83$. The mapping of $p(x)$ onto subcarriers is given by:

$$f(k, m) = \begin{cases} 16k + m & \text{if } k < 0 \\ 0 & \text{if } k = 0 \\ 16k + m - 15 & \text{if } k > 0 \end{cases}$$

$$\text{subcarrier}(k, 0, m, 2) = \begin{cases} p_1([f(k, m) + 41]) & \text{if } -41 \leq f(k, m) < 0 \text{ or} \\ & 0 < f(k, m) \leq 41 \\ 0 & \text{Otherwise} \end{cases}$$

In one aspect, the secondary preamble is mapped to the identity of a particular sector. Thus, a client station can identify a base station sector by detecting the secondary preamble.

In one aspect, the number of subchannels that the secondary preamble spans remains fixed independent of the number of subchannels that are used by the system. According to 802.16e, the preamble spans an entire symbol, thus spanning across every subchannel available for use to the system. The client station does not know how many subchannels are being used in the system when it first determines the sector identity based on the secondary preamble. Knowing the span of the secondary preamble aids the determination of the sector identity. According to another aspect, the secondary preamble spans the same number of subchannels as the primary preamble. However, in yet other aspects, the secondary preamble may span a greater number of subchannels such as, for example, to aid in channel estimation.

Continuing with the numerical example given above, each sector is assigned an identity number from 0 to 624. The sectors transmit a frequency domain Zadoff Chu sequence based on the identity number. According to one aspect, the secondary preamble always occupies subchannels −3 to 3 in symbol 3 of slot time 0 within a frame. Of these 96 subcarriers, only subcarriers −41 to 41 are occupied, the other subcarriers within these subchannels having no energy placed upon them. Of course, the DC subcarrier can also be vacant. With $N_{cell}^{ID}$ representing the sector identity, the subcarrier modulation is provided by:

$$\text{Subcarrier}(k, 0, m, 3) = \begin{cases} p[N_{CELL}^{ID}/25] + 16 \left( \begin{bmatrix} f(k,m) + 41 + \\ 3(N_{CELL}^{ID} \bmod 25) \end{bmatrix} \bmod 83 \right) & \text{if } -41 \leq f(k,m) < 0 \\ & \text{or } 0 < f(k,m) \leq 41 \\ 0 & \text{Otherwise} \end{cases}$$

Since a time delay corresponds to a frequency shift in the Zadoff-Chu sequence, the parameters in this formula have been selected so that sectors can be uniquely identified in the case of expected time of arrival differences between BSs. The cross-correlation between any two different Zadoff-Chu sequences, even after puncturing for a DC carrier, is still approximately −9 dB below the correlation peak, even against shifts in frequency.

Figure 5:
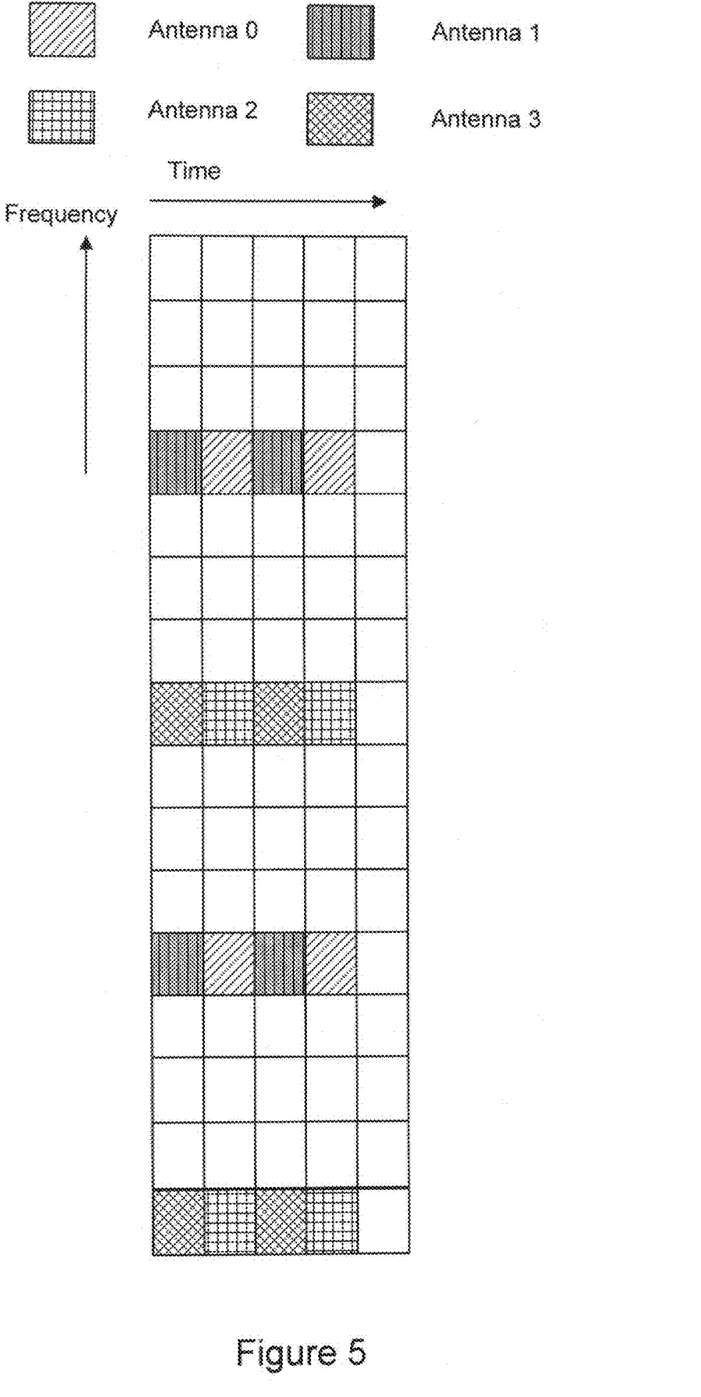
FIG. 5 is a simplified time/frequency diagram illustrating an embodiment of pilot placement within a slot.

FIG. 5 shows one slot of the downlink which indicates the subcarriers which carry the pilot bits as a function of the antenna port. In the exemplary embodiment, the system supports transmission on 1, 2, or 4 diversity antennas which are associated with a single sector. If only one antenna is used, it is designated as antenna 0. If 2 antennas are used, they are designated as antennas 0 and 1. If 4 antennas are used, they are designated as antennas 0, 1, 2, and 3. Each antenna has a unique placement of its pilots, one example of which is shown in FIG. 5.

According to FIG. 5, antenna 0 places pilots at subcarriers 4 and 12 on symbols 1 and 3 respectively of a slot. Antenna 1 places pilots at subcarriers 4 and 12, but on symbols 0 and 2 of a slot. Similarly, antennas 3 and 4 use subcarriers 0 and 8, with antenna 3 placing them in symbols 1 and 3, and antenna 4 placing them in symbols 0 and 2. Note that pilots are not placed in tones that are already occupied by the preamble.

According to one aspect, the same pilot pattern is used on both the downlink and the uplink. On the uplink, the client station often uses only 1 subchannel and at most 2 antennas. Because the base station and the client stations can more accurately use interpolation rather than extrapolation, the pilot signal location for antennas 0 and 1 is in the center portion of the slot.

According to the aspect described above, the pilots are consistently assigned to the same subcarriers within a slot, regardless of which base station sector is transmitting them and the permutation scheme being employed. In addition, the PN sequence used to modulate the pilot signals is tied directly to the base station sector identity. Knowing the location of the pilot bits within the slots and the sector identity, the client stations can more readily track the pilot signals received from interfering sectors. Doing so makes channel estimation less burdensome and more accurate.

Figure 6:
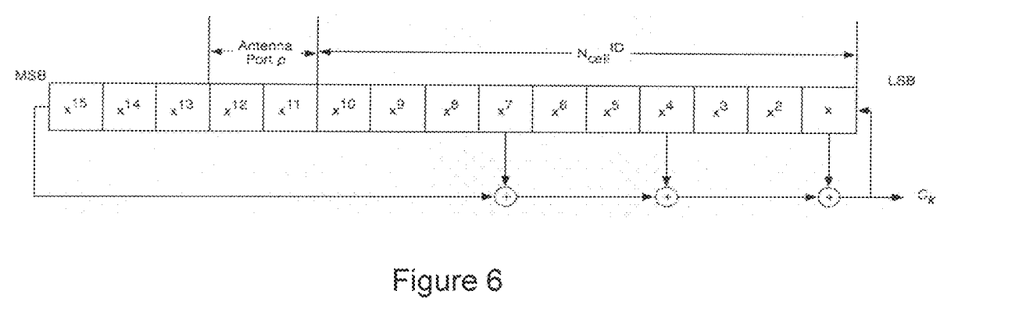
FIG. 6 is a simplified functional diagram illustrating a pilot sequence PN generator.

Continuing with the numerical example given above, the pilot codes are binary phase shift keying (BPSK) modulated by a 32767-bit M-sequence, generated from the polynomial $p(x)=x^{15}+x^7+x^4+x+1$. FIG. 6 shows an embodiment of a PN generator that creates such a sequence. The PN generator is initialized at the start of each frame with the sector identity $N_{cell}^{ID}$ and the antenna portp. For example, the 9 bit identity number is inserted into registers $x^1$ to $x^{10}$ and the two bit antenna port number is inserted into registers $x^{11}$ and $x^{12}$.

Using the subcarrier designations we developed above, the subcarriers are designated with an ordered quadruple (k,l,m,n), where k is the subchannel, l is the slot time within a frame, in is the subcarrier within the slot (k,l), and n is the symbol within the slot (k,l). The pilot bits produced by the PN generator are assigned to slots in increasing absolute value of k and then l. Thus as the bits are produced by the sequence generator, they are assigned in groups of 4 to each slot in the first column, such as slots (1,0), (−1, 0), (2,0), (−2,0) etc., until all subchannels of slot time 0 have been assigned.

Within a slot, 4 pilot bits are assigned first in order of increasing m, and then in order of increasing n. Thus, within these slots, for antenna 0, the first four pilot bits are inserted into subcarriers (1, 0, 4, 1), (1, 0, 12, 1), (1, 0, 4, 4), (1, 0, 12, 4) respectively The process then moves on to assign pilot bits to slots within slot time 1, such as (1,1), (−1,1), (2,1), (−2, 1), etc. This process continues until all slots in a frame have been assigned pilot bits. The decision to place a pilot bit in a particular position within a particular slot is made on a per tone (subcarrier) basis. For example, the pilot tones may be excluded from those subcarriers carrying preamble information.

Pilots are assigned in this way so that the client station can know what the pilot codes are for the broadcast and assignment channels, regardless of the number of subchannels.

Compared with other system embodiments utilizing distinct downlink signal configurations, such as 802.16e systems, the embodiments described hereinabove provide several advantageous features. For example according to 802.16e, it was not possible to predict either the location or the value of the pilot bits coming from a neighboring base station sector based solely on the sector identity. According to 802.16e, the pilot sequence is not generated based solely on sector identity and antenna port number. In addition, the placement of the pilot bits within a slot can vary, such as, based on the permutation scheme which is being used. According to certain aspects described herein, the location of the pilot bits within the slot remains consistent independent of these variables. Because both the pilot sequence and the pilot bit location described herein can be predicted based solely on the sector identity and the antenna port number, a client station can more easily determine the interference that it is experiencing from neighboring sectors.

The preceding example of pilot placement is given only by way of example. Other sequences and sequence generation methods may be used. For example, the example given above would need to be modified if the system includes an odd number of subchannels (i.e. $N_{sub}^{XX}$ is odd.) In such a system, pilot bits could be assigned based on half slots rather than full slots. In addition, the fixed placement of the pilot bits within a slot may vary from system to system. For example, a new scheme for the fixed placement of the pilot bits may be determined if the number of symbols per slot time changes.

In addition, in an alternative aspect of the disclosure, the primary and secondary preambles may be placed in a slot which occurs later in the frame, which placement in some circumstances may have an advantageous effect on system acquisition time.

The Physical Broadcast Channel (PBCH) can be a channel that is used to convey global system parameters to the client stations. For example, it carries system configuration information to be heard by all client stations in the system. The information packets sent over the broadcast channel are generally short, and are repeated infrequently.

Continuing with the numerical example given above, the physical broadcast Channel occupies subchannels −3 to 3 in symbols 0 and 1 of slot time 0 within a frame. Each frame contains one physical layer broadcast packet, which carries one or more complete MAC layer broadcast packets. The location of the broadcast channel in time and frequency, when combined with the pilot and preamble structure, allows for demodulation of the preamble with interference mitigation techniques using only the information obtained from the preamble search.

Figure 7:
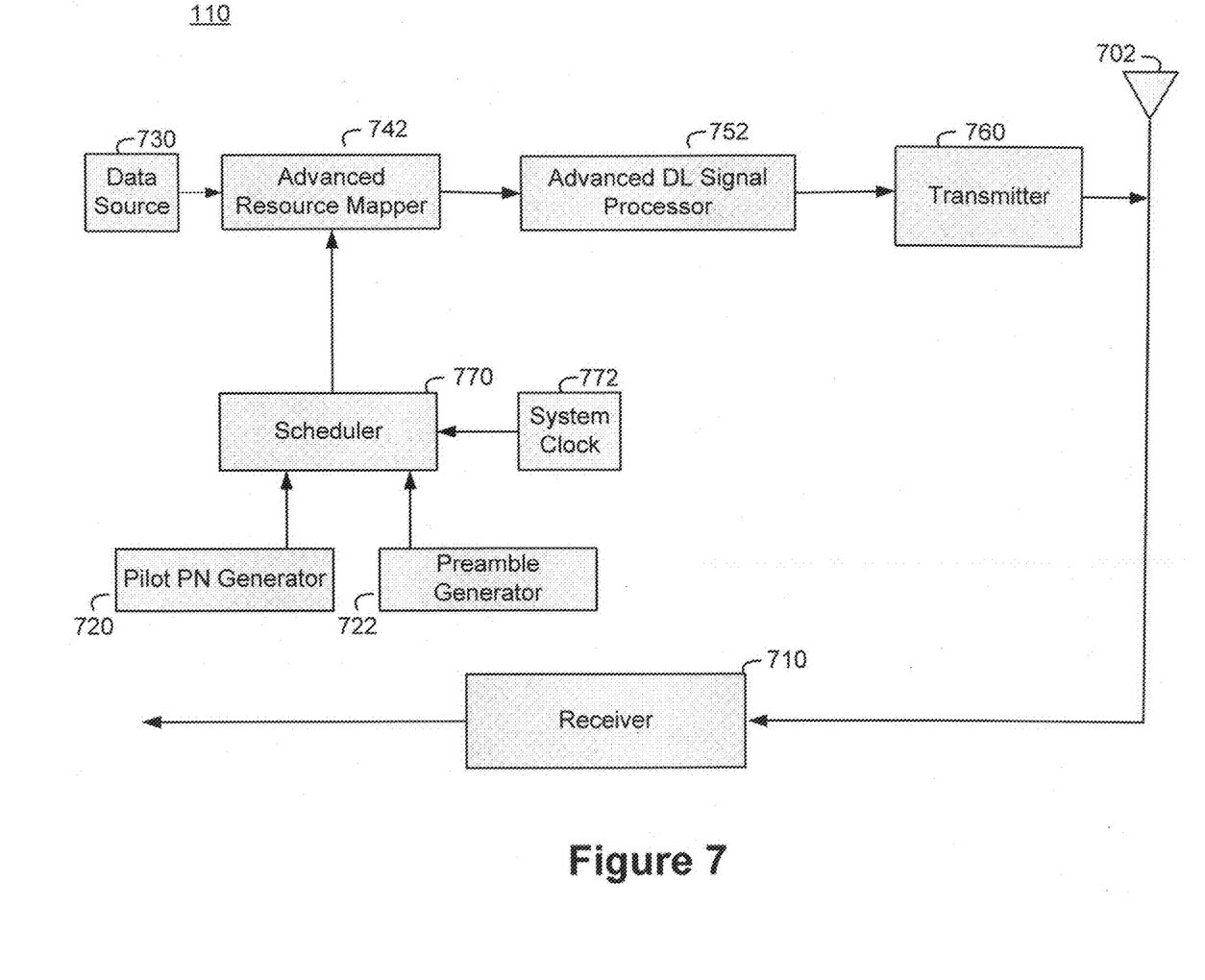
FIG. 7 is a simplified functional block diagram of an embodiment of a base station.

FIG. 7 is a simplified functional block diagram of an embodiment of a base station 110, which can be, for example, a base station in the system of FIG. 1.

The base station 110 includes a transmitter 760 and receiver 710 coupled to an antenna 702. The receiver 710 is configured to receive the uplink signals from one or more subscriber stations, for example, based on uplink resource allocations provided by the base station 110 in the downlink The downlink path includes a data source 730 that includes the bits or encoded symbols that are to be transmitted on the downlink resource allocations to the various subscriber stations within the coverage area supported by the base station 110 using the antenna 702.

The data source 730 is coupled to an input of an advanced resource mapper 742 that can be configured, for example, to support a legacy frame structure or a frame structure such as illustrated in FIGS. 2a and 2b.

A pilot PN generator 720 is configured to generate the pilot PN sequence, based, for example, on a base station ID, sector ID, or some other identifying parameter, or some combination thereof. The output of the pilot generator 720 can be coupled to another input of the scheduler 770

A preamble generator 722 can be configured to generate the primary preamble as well as the quasi-unique secondary preamble. The preamble generator 722 can couple the primary and secondary preambles to the scheduler 770. The preamble generator 722 can generate the universal primary preamble, for example, based on a look up table or a generator module. The preamble generator 722 can generate the secondary preamble in a similar fashion. For example, the preamble generator 722 can store the unique secondary preamble in a look up table in memory or can generate the secondary preamble using the Zadoff-Chu sequence, sector ID, some other identifying parameter, or some combination thereof.

The scheduler 770 can be coupled to or otherwise synchronized to a system clock 772. The scheduler 770 can selectively couple the pilot PN or preambles to the resource mapper 742 based on the system time provided by the system clock 772. The scheduler 770 can also reset the pilot PN generator 720 based on the system clock 772, for example, at the frame boundaries.

Figure 8:
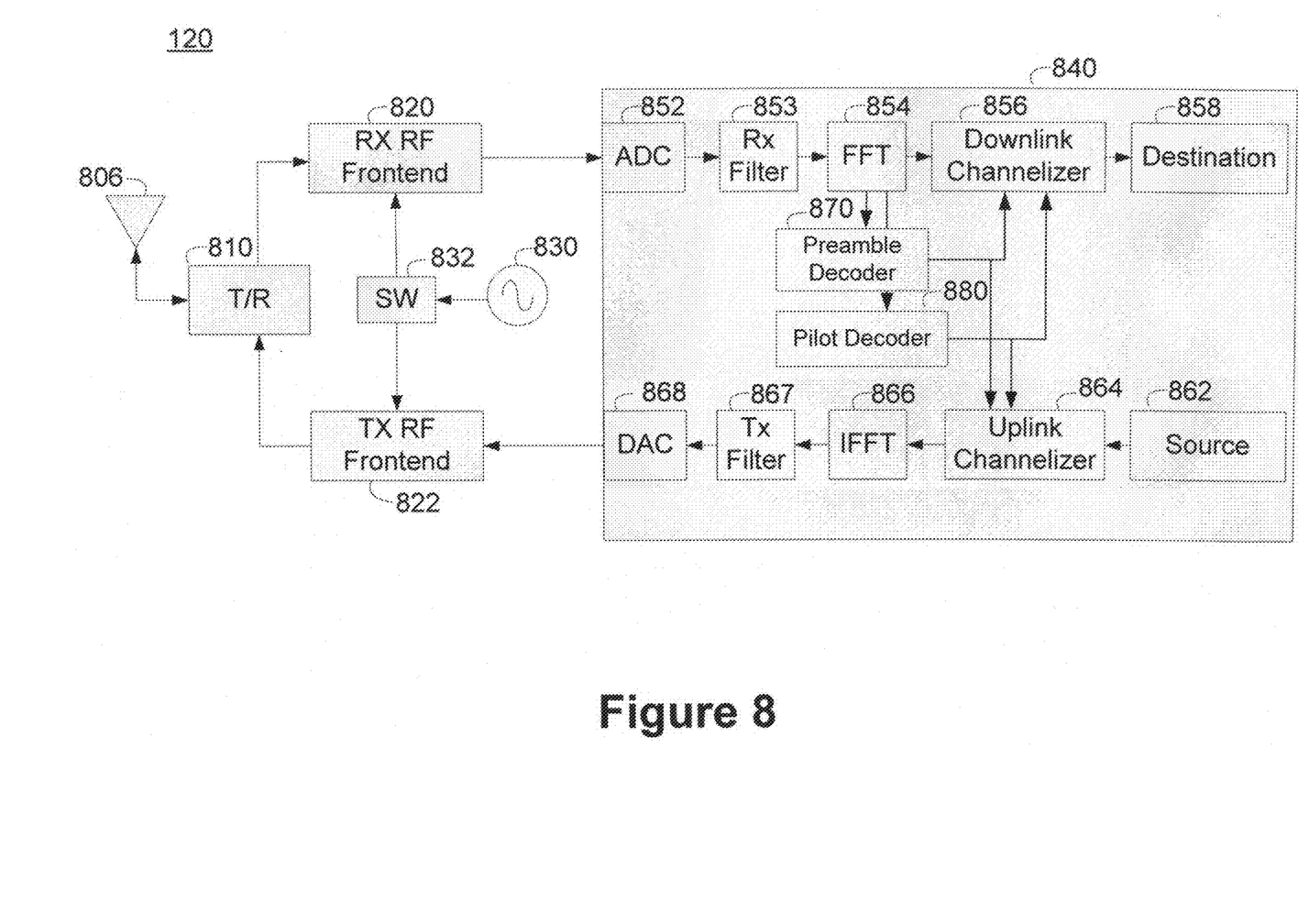
FIG. 8 is a simplified functional block diagram of an embodiment of a subscriber station.

FIG. 8 is a simplified functional block diagram of an embodiment of a subscriber station 120, alternatively referred to above as a client station. The subscriber station 120 can be, for example, the subscriber station 120 in the system of FIG. 1.

The subscriber station 120 includes a receiver configured to receive the efficient downlink signals and process the signals for acquiring, synchronizing, and managing communications in the wireless communication system.

The subscriber station 120 includes an antenna 806 through which the uplink and downlink signals are communicated. The antenna 806 couples the downlink signals to a transmit/receive (T/R) switch 810. The T/R switch 810 operates to couple the downlink signals to the receiver of the subscriber station 120 during a downlink subframe and operates to couple uplink signals from the transmitter portion of the subscriber station 120 during an uplink subframe.

During the downlink portion or subframe, the T/R switch 810 couples the downlink signals to a receive RF front end 820. The receive RF front end 820 can be configured, for example, to amplify, frequency convert a desired signal to a baseband signal, and filter the signal. The baseband signal is coupled to a receive input of a baseband processor 840.

The receive input of the baseband processor 840 couples the received baseband signal to an Analog to Digital Converter (ADC) 852 that converts the analog signal to a digital representation. The output of the ADC 852 can be coupled to a receive filter 853 that can be configured to substantially limit out of band noise and interference. The output of the receive filter 853 is coupled to a transformation module, such as Fast Fourier Transform (FFT) engine 854 that operates to convert the received time domain samples of an OFDM symbol to a corresponding frequency domain representation. The sample period and integration time of the FFT engine 854 can be configured, for example, based upon the downlink frequency bandwidth, symbol rate, subcarrier spacing, as well as the number of subcarriers distributed across the downlink band, or some other parameter or combination of parameters.

The output of the FFT engine 854 can be coupled to a downlink channelizer 856 that can be configured to extract the subcarriers from those symbols that are allocated to the particular subscriber station 120. The downlink channelizer 856 can be configured, for example, to extract the portion of the legacy or enhanced downlink sub-subframes for which the subscriber station 120 is allocated. The output of the downlink channelizer 856 can be coupled to a destination module 858. The destination module 858 represents an internal destination or output port to which received data may be routed.

The subscriber station 120 also includes a preamble decoder 870 configured to access the sampled downlink signals and acquire the primary preamble and unique secondary preamble. The subscriber station can also include a pilot decoder 880 configured to access the frame synchronized downlink samples to extract the pilot sequence. The pilot decoder 880 can also generate one or more channel estimates based on the decoded pilot signals. The preamble decoder 870 and the pilot decoder 880 can be coupled to the channelizer 856 to control the extraction of the data in the allocated downlink resources. Similarly, the preamble decoder 870 and the pilot decoder 880 can be coupled to the uplink channelizer 864 to control the allocation of uplink data to the appropriate allocated uplink resources.

The uplink path is complementary to the downlink signal path. A source module 862 of the base band processor 840, which may represent an internal data source or an input port, generates or otherwise couples uplink data to the baseband processor 840. The source 862 couples the uplink data to an uplink channelizer 864 that operates to couple the uplink data to appropriate uplink resources that are allocated to support the uplink transmission.

The output of the uplink channelizer 864 is coupled to an IFFT engine 866 that operates to transform the received frequency domain subcarriers to a corresponding time domain OFDM symbol. The uplink IFFT engine 866 may support the same bandwidth and number of subcarriers as supported by the downlink FFT engine 854.

The output of the uplink IFFT engine 866 is coupled to a transmit filter 867 that shapes the bandwidth and removes out of band noise. The output from the transmit filter 867 is coupled to a Digital to Analog Converter (DAC) 868 that converts the digital signal to an analog representation. The analog baseband signal is coupled to a transmit front end 822, where the signal is frequency translated to the desired frequency in the uplink band. The output of the transmit front end 822 is coupled to the T/R switch 810 that operates to couple the uplink signal to the antenna 806 during the uplink subframe.

An LO 830 is coupled to a switch 832 or demultiplexer that selectively couples the LO 830 to one of the receive front end 820 or transmit front end 822 so as to be synchronized to the state of the T/R switch 810

Methods and apparatus are described herein for efficient downlink signaling, generating of efficient downlink signals, and receiving efficient downlink signals in a wireless communication system. Additional related information can be found in related U.S. patent application Ser. No. 12/265,435, entitled "Advanced Technology Frame Structure with Backward Compatibility," which is incorporated by reference herein in its entirety.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosed embodiments. Various modifications to these embodiments will be readily apparent to those of ordinary skill in the art, and the generic principles defined herein may be applied to other embodiments without departing from the scope of the disclosure.

What is claimed is:

1. A method comprising:
   receiving, by a client station, an orthogonal frequency division multiple access (OFDM) signal, from a base station for use in cell search, the OFDM signal including a primary signal, a secondary signal and a pilot signal, the primary signal having a first pseudo random sequence, the secondary signal having a second pseudo random sequence and the pilot signal having a third pseudo random sequence;
   determining an identity of a cell, by the client station, based on at least the second pseudo random sequence of the secondary signal; and
   determining an antenna configuration identification based on the third pseudo random sequence of the pilot signal;
   wherein the third pseudo random sequence is based on the identity of the cell and the antenna configuration identification.

2. The method of claim 1 wherein the primary signal is a primary preamble and the secondary signal is a secondary preamble.

3. The method of claim 1 wherein the primary signal and the secondary signal are received in a predetermined bandwidth that is different than a bandwidth of the cell.

4. The method of claim 1 further comprising:
   receiving, by the client station, a second OFDM signal, from the base station, the second OFDM signal including a second primary signal, a second secondary signal and a second pilot signal, the second primary signal having the first pseudo random sequence, the second secondary signal having the second pseudo random sequence and the pilot signal having a fourth pseudo random sequence different from the third pseudo random sequence; and
   determining, by the client station, a second antenna configuration identification different than the antenna configuration identification determined by the third pseudo random sequence.

5. The method of claim 1 wherein the bandwidth of the OFDM signal is fixed for a plurality of frames and is less than a bandwidth of the cell.

6. The method of claim 1 wherein the OFDM signal is used by the client station to synchronize to the base station and acquire system information.

7. The method of claim 6 wherein the system information is included in a physical broadcast channel.

8. The method of claim 1 wherein the primary signal spans an OFDM symbol and the secondary signal spans an OFDM signal.

9. The method of claim 1 wherein the identity of the cell is further determined by the first pseudo random sequence.

10. The method of claim 1 wherein at least one of the first, second or third pseudo random sequence is an M-sequence.

11. A client station comprising:
    a receiver configured to receive an orthogonal frequency division multiple access (OFDM) signal, from a base station for use in cell search, the OFDM signal including a primary signal, a secondary signal and a pilot signal, the primary signal having a first pseudo random sequence, the secondary signal having a second pseudo random sequence and the pilot signal having a third pseudo random sequence; and
    a processor configured to determine an identity of a cell based on at least the second pseudo random sequence of the secondary signal; and
    determining an antenna configuration identification based on the third pseudo random sequence of the pilot signal;
    wherein the third pseudo random sequence is based on the identity of the cell and the antenna configuration identification.

12. The client station of claim 11 wherein the primary signal is a primary preamble and the secondary signal is a secondary preamble.

13. The client station of claim 11 wherein the primary signal and the secondary signal are received in a predetermined bandwidth that is different than a bandwidth of the cell.

14. The client station of claim 11, wherein:
the receiver is further configured to receive a second OFDM signal, from the base station, the second OFDM signal including a second primary signal, a second secondary signal and a second pilot signal, the second primary signal having the first pseudo random sequence, the second secondary signal having the second pseudo random sequence and the pilot signal having a fourth pseudo random sequence different from the third pseudo random sequence; and
the processor is further configured to determine a second antenna configuration identification different than the antenna configuration identification determined by the third pseudo random sequence.

15. The client station of claim 11 wherein the bandwidth of the OFDM signal is fixed for a plurality of frames and is less than a bandwidth of the cell.

16. The client station of claim 11 wherein the OFDM signal is used by the client station to synchronize to the base station and acquire system information.

17. The client station of claim 16 wherein the system information is included in a physical broadcast channel.

18. The client station of claim 11 wherein the primary signal spans an OFDM symbol and the secondary signal spans an OFDM signal.

19. The client station of claim 11 wherein the identity of the cell is further determined by the first pseudo random sequence.

20. The client station of claim 11 wherein at least one of the first, second or third pseudo random sequence is an M-sequence.

* * * * *